3,335,869
METHOD FOR IMPROVING PERLITE FILTER-AIDS WITH A PHOSPHORIC AGENT
Kenneth B. Hedges, Gardena, Calif., assignor to Metro Minerals, Gardena, Calif., a corporation of California
No Drawing. Filed Nov. 14, 1963, Ser. No. 323,607
6 Claims. (Cl. 210—500)

This invention relates generally to the preparation of perlite filter-aids, and more particularly to a method for treating a relatively low flowrate perlite filter-aid, with an agent containing phosphoric acid or a salt thereof.

In the art of filtration, it is conventional to remove suspended particles from a liquid either by passing the liquid through a bed of filter-aid or by mixing the liquid with a filter-aid and then passing the mixture through a septum (cloth or screen) or through a bed of filter-aid. Commonly used filter-aids include natural, calcined and flux calcined diatomaceous earth, asbestos, fibers, wood pulp, and perlite minerals.

The minerals now commonly classified as perlitic are rhyolitic volcanic glasses, which have the property of expanding when subjected to high temperatures under suitable conditions. In the present descriptions and in the appended claims, the term "perlite" is used to embrace a variety of minerals of closely related physical and chemical properties including perlite, pumice, pumicite, obsidian, pitchstone, certain forms of heat expandable volcanic ash and any volcanic glass containing combined water.

Heretofore, perlite, although much cheaper than diatomaceous earth has been barred from many plants in which huge capital investment has been made for the processing of a specific liquid with diatomaceous earth filter-aid. These plants, by virtue of their method of treating, the material treated, and the type of equipment installed, must employ a filter-aid which has a flowrate of a certain value, no more and no less, and which must be available at that flowrate value, consistently from month to month. Unfortunately, perlite filter-aids have generally been characterized by a flowrate in a range substantially lower than that of diatomaceous earth. Moreover, the perlite filter-aid produced by a given manufacturer has not been maintained at a consistent value; perlite produced at one time of the year would have a flowrate very different from that produced a few months later by the same plant. Consequently, the cheaper perlite filter-aid has been barred from use in many major industrial applications which are already committed to a certain flowrate characteristic of diatomaceous earth.

In the art of manufacturing filter-aids from perlite, it is conventional to expand (vesiculate) the mineral by suitable heat treating process, then grinding (comminuting) and/or classifying the expanded perlite to a powder useful as a filter-aid. The expanded perlite is not particularly useful as a filter-aid because it is comprised of vesicular particles which are characteristically lighter than water. A large portion of these will float on most filterable liquids, and being too large are not considered to be useful as a filter-aid for most filtrations. Therefore, it is conventional to reduce these large "float" particles by comminuting by various types of comminuting devices, and/or classifying the comminuted particels by various types of classifying devices. The classification yields two or more products, one or more of which will be useful as a filter-aid, and one or more of which can be rejected as waste material, or returned to the comminuting device for further reduction in size.

It has been found that when a substantial portion (greater than 90% by weight) of the vesicular particles are reduced to fragments by comminution and/or classification, the resulting filter-aid is a useful product. However, the relative rate of flow of the filterable liquid through a filtration device is lower than sometimes desired. It has also been found that when larger percentages of the particles are vesicular, even though the relative flowrate may be higher, the resulting relative inefficiency of removal of particles from a filterable liquid is deleterious to the usefulness of the filter-aid.

It is a major object of the invention to provide a novel process for the manufacture of perlite filter-aids with improved filtration characteristics.

It is a second major object of the invention to provide a process for treating a perlite filter-aid to increase its flowrate to a predetermined desired value.

A part of this object of the invention is to provide the perlite producer with a process by which he can produce a custom-made perlite, with a flowrate specified by the buyer for the buyer's particular filtering machinery. Moreover, it is an object of this invention to provide such controls over the flowrate characteristic of the processed filter-aid that a perlite filter-aid with the same flowrate can be produced month after month despite variations in the starting perlite material.

It is a further object of the invention to provide a novel process for the manufacture of perlite filter-aids with higher ratios of relative flowrate to weight percent "float material" over and above what has been accomplished heretofore.

It is further an object of the invention to provide a novel process for the manufacture of relatively high flowrate perlite filter-aids from relatively low flowrate perlite filter-aids, heretofore unusable in some filtering applications.

It is a further object of the invention to provide an improved perlite filter-aid having higher ratios of relative flowrate to weight percent "float material" over and above what has been accomplished heretofore.

The invention comprises the method of, and the product resulting from heating a mixture of perlite particles resulting from the comminutation of expanded (vesiculated) perlite, and from about 0.10% (by weight of perlite, calculated as $P_2O_5$) to about 10% (by weight of perlite, calculated as $P_2O_5$) of at least one of the agents of the group consisting of the oxy acids of phosphorous, and their inorganic salts.

The proportion of the solvent should be sufficient to wet the surface of the perlite. I have found that the resultant product has a higher filtration flowrate, and a lower filter cake density. Both these changes in filter-aid characteristics are very valuable in the field of filtration.

In the most preferred and valuable form of my invention, it provides a method for converting a perlite filter-aid to a filter-aid having a predetermined desired flowrate, by controlling the selection of treating agent, and/or the ratio of treating agent used to perlite treated. Tables 3 and 5, set forth hereinafter disclose a typical, experimentally determined set of values for different agents, and different quantities of phosphoric acid content, when applied to a typical standard commercial perlite product. However, it will be appreciated that practical application of the process will require that pilot tests be conducted to determine the best agent and the proper quantity of it, to be employed, in treating a particular batch of perlite to achieve a desired flowrate characteristic in the treated filter-aid.

It will be further understood that a final step of re-milling the filter-aid may be necessary in order to achieve the desired flowrate. This will be dependent partly upon the type of equipment used for adding the phosphoric acid agent and then drying the wetted filter-aid. The final milling step helps to break up any coarse aggregate material formed. Moreover, it may be controlled in degree and fineness to provide additional control over the ultimate flowrate characteristic of the treated perlite.

The products of my invention and a method of producing them are illustrated in more detail in the following specific examples. The proportions of materials are expressed as parts by weight.

EXAMPLE I

To 100 parts of perlite particles having the characteristics listed in Table I, Sample B, there is mixed 3 parts orthophosphoric acid ($H_3PO_4$) and 47 parts water. The water was first mixed with the orthophosphoric acid in order to facilitate the mixing of the acid with the perlite particles. More or less water or any other suitable solvent could have been used to accomplish this purpose, depending upon the method of mixing. However, one of the criteria for the successful application of this invention is that the agent be dissolved in a solvent. The mixture was then heated in a muffle furnace until it was dry. The mixture was then removed from the furnace and comminutated by brushing through a #100 U.S. series screen. This procedure is necessary only if lumps of particles are formed by the heating process. The comminution of the lumps could also have been accomplished by any comminution device such as a hammer mill, a milling air blower or a ball mill. Filter-aid characteristics of the resultant perlite particles are compared to the filter-aid characteristics of the perlite particles used as the starting material in the above process in Table II.

In the above mentioned example a muffle furnace was used to effect the heating of the mixture. Any conventional method of heating such, as a rotating kiln, a batch furnace, or a fluidizing furnace could have been used.

The mixing of the phosphorous compound into the perlite particles could have been accomplished by spraying a solution of the compound into an airstream of the particles prior to a collection device, or by spraying a solution of the compound into a fluidized stream of the perlite particles, or by adding the solution to a pug mill, a screw conveyor, or any conventional mixing device.

Starting material used may be almost any of the perlite filter-aids found in industrial use. Starting material is assumed to be perlite which has already been expanded and comminuted. However, its particle size may extend over substantial range, as shown for the typical examples in Table I.

It is an interesting fact that the treated material produced by the process of this invention may exhibit the same particle range as the starting material from which it was made, and yet have a higher flowrate.

In one preferred form of the invention, a final milling step may be employed to control particle size of the finished filter-aid product. In this embodiment of the invention, the finished filter-aid product may be either coarser or finer than the starting material.

It will be seen from the following tables, that the perlite processor, has available to him within the scope of this invention many alternative ways of producing a filter-aid of precisely the flowrate desired, no more and no less, regardless of the characteristics of the perlite starting material. Moreover, the perlite filter-aid may be processed by the invention to raise the flowrate to grades of filter-aids customarily pre-empted by diatomaceous earth. Consequently, the process makes it possible to produce a cheap perlite filter-aid tailor-made to be employed in plants which have hitherto been restricted to diatomaceous earth.

TABLE I.—TYPICAL CHARACTERISTICS OF STARTING MATERIALS

|  | Sample A | Sample B | Sample C |
|---|---|---|---|
| Particle Size, wt. percent: [1] | | | |
| 0–5 microns | 80.0 | 34.0 | 7.0 |
| 5–10 microns | 16.0 | 36.0 | 34.0 |
| 10–20 microns | 3.5 | 14.0 | 21.0 |
| 20–40 microns | 0.5 | 5.0 | 14.0 |
| +40 microns | 0.0 | 11.0 | 24.00 |
| Screen Analysis, wt. percent: [2] | | | |
| +150 mesh | Nil | 8.0 | 18.0 |
| −150 − +325 mesh | 0.1 | 8.0 | 27.0 |
| −325 mesh | 99.9 | 84.0 | 55.0 |
| Float, wt. percent | Trace | 3.0 | 10.0 |

[1] Sedimentation particle size by the hydrometer method.
[2] Wet screened.

Samples A, B and C of Table I serves to show the characteristics of various types of comminuted, expanded perlite useful in the practice of my invention. Sample A is a very finely comminuted expanded perlite with only a trace of float (vesicular) material. Sample B has an average particle size distribution with an average percentage of float material. Sample C is fairly coarse with a relatively high percentage of float material (10% by weight).

Table II shows typical increases in flowrate achieved by the method of the invention, and a comparison of those flowrates and other characteristics of the treated perlite, with those of high flowrate diatomaceous earth.

TABLE II.—COMPARISON OF FILTER-AID CHARACTERISTICS OF STARTING MATERIAL VERSUS NEW PRODUCT

| Sample | | Water [1] Permeability Flowrate | Cake [2] Density | Sugar [3] Flowrate | Filtered [4] Sugar Clarity |
|---|---|---|---|---|---|
| A | Starting Material | 0.14 | 24.0 | 2.4 | 185 |
|   | New Product | 3.21 | 17.0 | 11.3 | 124 |
| B | Starting Material | 1.48 | 14.5 | 7.7 | 136 |
|   | New Product | 9.85 | 12.2 | 22.3 | 107 |
| C | Starting Material | 4.62 | 12.0 | 13.6 | 114 |
|   | New Product | 14.20 | 10.6 | 24.8 | 99 |
| D | High Flowrate Diatomaceous Earth Filter-aid. | 9.63 | 21.0 | 17.4 | 100 |

[1] Liters/hour/square centimeter through one centimeter cake at 30° centigrade, 20 inches mercury differential pressure.
[2] Pounds per cubic foot.
[3] Average gallons per hour per square foot, 8 hour cycle length.
[4] Ratio of Tyndall light in microvolts of sample versus standard (high flowrate diatomaceous earth filter-aid) times 100.

Table II also shows the filtration characteristics (water permeability flowrates, sugar flowrates and clarities, and filter cake densities) of Samples A and C, before and after being processed the same as Sample B, Example I. Again the increased flowrate and lower filter cake density is very apparent.

Water permeability flowrate is measured by suspending filter-aid in water, then passing the water through a filter forming a cake of the filter-aid. Then water is passed through the cake under controlled conditions of temperature and differential pressure. Measurements of the rate of flow of the water and the length of the cake are taken and the results are expressed as liters per hour per square centimeter of filter area per centimeter of cake length with constant water temperature and constant differential pressure.

Cake density is measured by taking the volume and dry weight of the above-mentioned filter cake and expressing density in pounds per cubic foot.

Sugar flowrate is measured by filtering 60° Brix sugar containing 0.05% filter-aid at 80° centigrade, at 20 pounds per square inch differential pressure. The results are expressed as average gallons per hour per square foot over an eight hour filtration cycle. As can be seen by Table II, sugar flowrates correlate very good with water permeability flowrate.

TABLE III.—EFFECT OF VARIOUS AGENTS

| | | Water Permeability Flowrate | Cake Density |
|---|---|---|---|
| 1 | $NH_4H_2PO_4$ | 8.12 | 13.3 |
| 2 | $(NH_4)_2HPO_4$ | 6.94 | 13.3 |
| 3 | $Na_3PO_4 \cdot 12H_2O$ | 6.30 | 13.0 |
| 4 | $NaH_2PO_4 \cdot H_2O$ | 6.50 | 13.2 |
| 5 | $H_3PO_4$ | 9.40 | 12.7 |
| 6* | $H_3PO_4 + Al_2(SO_4)_3$ | 14.1 | 12.2 |
| 7* | $H_3PO_4 + AlPO_4$ | 14.0 | 12.2 |
| 8 | $P_2O_5$ | 9.40 | 12.7 |

*1.7% $Al^2O^3$
Starting material—Perlite B; 2.25% $P_2O_5$ on all samples; 1200° F. for 15 minutes.

Table III shows the effect of various agents useful in the practice of my invention. These agents were selected as examples of agents from the group consisting of the oxy acids of phosphorous, and their inorganic salts. Of course, other examples of these groups will be effective in the practice of the invention, however, some of these agents might not be as desirable because of incorporating in the finished product undesirable metallic ions or because of higher initial cost of the agent.

Examples 6 and 7 show very much preferred forms of the process. However, in certain exceptional situations, rather inferior species of the invention may be employed. For example, in Example 6, some other metals, such as iron, might be used in a suitable chemical combination, in place of the aluminum sulfate. However, iron is usually undesirable in a filter-aid since it tends to add a color to the filtered liquid. Likewise, in Example 7, the process is not limited to phosphoric acid. Any acid which is not otherwise deleterious to the process, and which will put the aluminum phosphate in aqueous solution, may be used; however, the quantity of phosphate ion must then be made up from some source other than the acid.

Samples 6 and 7 of Table III show the increased flowrate effect of the use of aluminum ion in conjunction with a source of phosphate ion. This increased effect can be very useful whenever very high flowrates are needed.

In the practice of my invention, I have discovered that the phosphorous compound may be added to the perlite at any stage of the perlite filter-aid manufacturing process prior to the drying stage. It may be added to the perlite ore prior to expansion, or to the expanded perlite prior to comminuting, or to the comminuted perlite prior to the drying stage. The solvent for the phosphorous compound, however, can only be mixed with the perlite and phosphorous compound prior to the comminuting, or prior to the drying stage. The preferred time for the addition of the solvent is prior to the drying stage since if the solvent is added prior to the comminuting stage, the solvent might interfere with the efficiency of comminuting.

In a further embodiment of the invention a group of subsamples chosen from Sample B of Table I were treated in accordance with the method outlined in Example I with the exception that the mixtures were heated for various times and temperatures. Table IV shows the water permeability flowrates and cake densities of the processed samples.

TABLE IV.—EFFECT OF TIME AND TEMPERATURE

| Time, Minutes | 400° F. | | 700° F. | | 1,000° F. | |
|---|---|---|---|---|---|---|
| | Water P.F.R. | Cake Density | Water P.F.R. | Cake Density | Water P.F.R. | Cake Density |
| 5 | Wet | Wet | Wet | Wet | 11.4 | 12.0 |
| 10 | Wet | Wet | Wet | Wet | 10.4 | 12.1 |
| 20 | Wet | Wet | 9.7 | 12.4 | 10.3 | 12.2 |
| 40 | Wet | Wet | 9.6 | 12.2 | 9.5 | 12.5 |
| 80 | 8.8 | 12.9 | 9.7 | 12.2 | 9.2 | 12.8 |

The results in Table IV show that it is only necessary to dry the mixture in order to obtain the increased flowrate effect of my invention. It is obvious that lower temperatures require longer drying times and higher temperatures require shorter drying times. Maximum temperatures of the mixture should be below the melting, fusing or sintering point of the perlite.

In a further embodiment of my invention a group of subsamples chosen from Sample B of Table I were treated in accordance with the method outlined in Example I with the exception that various percentages of the phosphorous compound were employed. Table V shows the water permeability flowrate and cake densities of the processed samples.

TABLE V.—EFFECT OF RATIO OF AGENT TO MATERIAL TREATED

| Percent $P_2O_5$ (by weight) | Water Permeability Flowrate | Cake Density, pounds/cubic foot |
|---|---|---|
| 0 | 1.40 | 16.4 |
| 0.10 | 2.60 | 14.8 |
| 0.25 | 6.75 | 14.0 |
| 0.50 | 8.20 | 13.4 |
| 1.00 | 9.30 | 13.0 |
| 2.00 | 9.85 | 13.2 |
| 4.00 | 10.4 | 13.1 |
| 6.00 | 10.9 | 13.4 |
| 10 | 10.9 | 13.5 |

The results in Table V indicate that as the percentage of phosphorous compound increases the water permeability flowrate increases. The limiting maximum percentage for this effect is about 10 percent.

In the practice of my invention a percentage will be chosen depending upon the desired flowrate of the resultant product, and as determined by testing pilot samples. It is very valuable to those industries using a filtration process to have available filter-aids with specific flowrate which is constant from batch to batch, and can be relied on to perform in constant manner.

In a further embodiment of my invention, a group of subsamples chosen from Sample B of Table I were treated in accordance with the method outlined in Example I with the exception that various amounts of solvent (in this instance the solvent was water) were used. Table VI summarizes the resulting data.

TABLE VI.—EFFECT OF PERCENT SOLVENT ON PRODUCT CHARACTERISTICS

| Weight Percent [1] Solvent | Water Permeability Flowrate | Cake Density |
|---|---|---|
| 0 | 1.62 | 14.8 |
| 1 | 1.88 | 14.6 |
| 5 | 3.30 | 14.0 |
| 10 | 6.74 | 13.6 |
| 25 | 9.2 | 10.8 |
| 50 | 10.7 | 11.5 |
| 100 | 9.83 | 13.0 |
| 150 | 3.75 | 14.7 |
| 200 | 1.95 | 18.1 |
| 300 | 1.39 | 18.9 |

[1] Weight percent based on perlite.

It can be seen from the results listed on Table VI that there is a limiting minimum and maximum percentage of solvent necessary for the successful practice of my invention. I have found that the minimum percentage of solvent is a function of the efficiency of mixing the solvent with the perlite particles, and also is a function of the surface area of the perlite particles. It will be obvious to those skilled in the art that increased amounts of solvent will increase either the drying time or temperature or both, therefore the preferred percentage of solvent is that amount wihch will substantially coat the surface of the perlite. On the other hand, excessive water use in the application of the phosphoric acid agent (above about 200%) has been found to have adverse effects on the resultant filter-aid.

Having thus described my invention, what I claim as new and desire to secure by Letters Patent is:

1. A method for treating a perlite filter-aid having a low flowrate to increase the flowrate of said filter-aid which method includes the steps of: producing a comminuted expanded perlite filter-aid wetted with an aqueous solution containing an aqueous solvent and at least one agent of the group consisting of the oxy acids of phosphorous, and their soluble inorganic salts, said agent being present in an amount to provide between about .1% and 10% of $P_2O_5$ by weight of the perlite treated, said aqueous solvent being present in an amount of not more than 200% by weight of the weight of the perlite treated; and heating said wetted perlite to a temperature sufficiently high to drive off said solvent without producing calcination or fusing of said perlite.

2. A method as described in claim 1 in which the flowrate of the final product is modified by milling the perlite after the heating step.

3. A method for treating a comminuted expanded perlite filter-aid having a relatively low flowrate, to increase the rate of said filter-aid to a predetermined value, which method includes the steps of: wetting said filter-aid with an aqueous solution containing an aqueous solvent and at least one agent of the group of the oxy acids of phosphorous and their soluble inorganic salts, said agent being present in an amount to provide between about .1% and 10% $P_2O_5$ by weight of the perlite treated, said aqueous solvent being present in an amount of not more than 200% by weight of the perlite treated, and in an amount to produce said predetermined flowrate, as predetermined by tests of said perlite with said aqueous solution; and heating said wetted perlite to a temperature sufficiently high to drive off said solvent without producing calcination or fusing of said perlite.

4. A method as described in claim 3 in which said agent is orthophosphoric acid.

5. A method as described in claim 3 in which the agent employed is comprised at least one-half of aluminum phosphate in an acid aqueous solution.

6. A method for treating a comminuted expanded perlite filter-aid having a relatively low flowrate, to increase the rate of said filter-aid to a predetermined value, which method includes the steps of: wetting said filter-aid with an aqueous solution containing an aqueous solvent and at least one agent of the group of the oxy acids of phosphorous and their soluble inorganic salts, said agent being present in an amount to provide between about 0.1% and 10% $P_2O_5$ by weight of the perlite treated, said aqueous solvent being present in an amount of not more than 200% by weight of the perlite treated, in said range in a proportion to the desired increase in flowrate, between points established by pilot runs; and heating said wetted perlite to a temperature sufficiently high to drive off said solvent without producing calcination or fusing of said perlite.

References Cited

UNITED STATES PATENTS

| | | | |
|---|---|---|---|
| 2,665,813 | 1/1954 | Bollaert | 210—500 XR |
| 2,798,674 | 7/1957 | Denneny | 210—500 XR |
| 2,898,303 | 8/1959 | Houston | 252—378 |
| 2,956,016 | 10/1960 | Leppla | 219—500 XR |

LEON D. ROSDOL, *Primary Examiner.*

ALBERT T. MEYERS, *Examiner.*

M. WEINBLATT, *Assistant Examiner.*